United States Patent
Nolen et al.

(10) Patent No.: US 11,126,160 B1
(45) Date of Patent: *Sep. 21, 2021

(54) METHOD FOR PRODUCING A SCALED-UP SOLID MODEL OF MICROSCOPIC FEATURES OF A SURFACE

(71) Applicants: Dustin Kyle Nolen, Mount Olive, AL (US); Raymond George Thompson, Hoover, AL (US); Alex F Farris, III, Birmingham, AL (US)

(72) Inventors: Dustin Kyle Nolen, Mount Olive, AL (US); Raymond George Thompson, Hoover, AL (US); Alex F Farris, III, Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,311

(22) Filed: Aug. 14, 2019

Related U.S. Application Data

(63) Continuation-in-part of application No. 15/965,959, filed on Apr. 29, 2018, now Pat. No. 10,769,851.

(51) Int. Cl.
| | | |
|---|---|---|
| *G06T 17/10* | (2006.01) | |
| *G05B 19/4099* | (2006.01) | |
| *G06T 19/20* | (2011.01) | |

(52) U.S. Cl.
CPC .......... *G05B 19/4099* (2013.01); *G06T 17/10* (2013.01); *G06T 19/20* (2013.01); *G05B 2219/49023* (2013.01); *G06T 2210/36* (2013.01); *G06T 2219/2012* (2013.01); *G06T 2219/2016* (2013.01)

(58) Field of Classification Search
CPC ....... B29C 64/106; B29C 64/40; B33Y 10/00; B33Y 40/00
See application file for complete search history.

(56) References Cited

U.S. PATENT DOCUMENTS

| | | | |
|---|---|---|---|
| 6,202,037 B1 * | 3/2001 | Hattori | H01L 22/20 702/182 |
| 7,489,332 B2 * | 2/2009 | Kremen | G03H 1/26 348/51 |
| 9,311,746 B2 * | 4/2016 | Gravois | G06K 9/00221 |
| 2005/0068415 A1 * | 3/2005 | Kremen | G02B 30/27 348/51 |
| 2016/0236414 A1 * | 8/2016 | Reese | B33Y 50/02 |

(Continued)

*Primary Examiner* — Vincent H Tran
(74) *Attorney, Agent, or Firm* — Lanier Ford Shaver & Payne, PC; Gerald M. Walsh

(57) ABSTRACT

A method for producing a scaled-up solid model of microscopic features of a selected surface of an article, such as a piece of metal exposed to friction. The metal surface is scanned with a profilometer along X, Y, and Z coordinates to obtain measurements of microscopic surface features. A 3-D high resolution spatial map of the microscopic surface features is made, and the X, Y, and Z measurements are scaled up. The spatial map is converted into a high resolution 3-D scaled-up computer model. The Z measurement in the 3-D scaled up computer model is scaled up 3 to 20 times more than the amount used to scale up the X and Y measurements to increase the depth of the 3-D scaled up computer model. A data set of printing instructions is created from the 3-D scaled-up computer model, a solid scaled-up model of the selected surface is manufactured in the 3-D printer, and the surface of the scaled-up model is colored to match the metal surface.

10 Claims, 2 Drawing Sheets

(56) References Cited

U.S. PATENT DOCUMENTS

| | | | | |
|---|---|---|---|---|
| 2017/0292916 A1* | 10/2017 | Yang | ............... | G01N 21/8851 |
| 2017/0332962 A1* | 11/2017 | Ashcroft | ............. | A61C 19/06 |
| 2017/0345172 A1* | 11/2017 | Gustin | ................ | A61F 13/84 |
| 2017/0345173 A1* | 11/2017 | Gustin | ................ | A61F 13/84 |
| 2018/0290394 A1* | 10/2018 | Ho | ..................... | B33Y 30/00 |
| 2018/0304540 A1* | 10/2018 | Tobia | ................ | B22F 3/1021 |
| 2018/0311902 A1* | 11/2018 | Ho | .................... | B29C 64/112 |

\* cited by examiner

Scan a selected surface with a profilometer along X, Y, and Z coordinates to obtain measurements of surface features having 0.5 micron resolution. Step 1

↓

Make a 3-D high resolution spatial map of the selected surface features, scaling up the X, Y, and Z measurements up to 1,000 fold. Step 2

↓

Transpose the spatial map into a high resolution 3-D scaled-up meshed surface. Step 3

↓

Manipulate the surface geometry of the 3-D scaled-up meshed surface as desired to obtain the desired scaled-up features and to enhance details of the 3-D scaled-up meshed surface by scaling up measurements for the Z-coordinate (depth) Step 4

↓

Create a data set of printing instructions from the 3-D scaled-up meshed surface acceptable for a 3-D printer. Step 5

↓

Print a solid scaled-up model of the selected surface in any desired size using the printing instructions in the 3-D printer and using a filament extrusion method. Step 6

↓

Color the surface of the solid scaled-up model by printing a color photograph of the selected surface on the surface of the solid scaled up model using a 2-D an ink-jet printer. Step 7

Fig. 1

METHOD FOR PRODUCING A SCALED-UP SOLID MODEL OF MICROSCOPIC FEATURES OF A SURFACE

CROSS-REFERENCE TO RELATED APPLICATIONS

This application claims the benefit of U.S. Non-provisional application Ser. No. 15/965,959, filed Apr. 29, 2018 which is incorporated herein by reference in its entirety.

FIELD OF THE INVENTION

This invention relates to methods of measuring three dimensional (3-D) microscopic features of a surface and, more particularly, to creating scaled-up solid models of the microscopic features of a surface.

BACKGROUND OF THE INVENTION

In the development of improved anti-friction agents and lubricants, surfaces are exposed to stress techniques such Falex pin and vee-block testing to estimate the effectiveness of an anti-friction agent. The stress techniques can produce precise, reproducible abrasions, scoring, and pitting on the surface. An effective anti-friction agent or lubricant will reduce the surface damage produced by these stress techniques in a measurable way. To visualize the reduction in surface damage of the surface it is necessary to use magnifying devices such as a binocular magnifying glass, an optical microscope, or a scanning electron microscope.

In the process of marketing and selling a lubricant, it is advantageous to show visually and directly the improvements in a surface produced by the lubricant. However, it is necessary to use magnifying devices to see the 3-D features of the surface. The use of these optical devices is not feasible or practical for showing the surface to potential buyers. What is needed is an accurate, scaled-up solid physical model of the 3-D microscopic features of a surface and a practical, inexpensive method of manufacturing the scaled-up model.

SUMMARY OF THE INVENTION

This invention provides a method for producing a scaled-up solid model of microscopic features of a selected surface of an article. The selected surface is scanned with a profilometer along X, Y, and Z coordinates to obtain measurements of microscopic surface features. A 3-D high resolution spatial map is made of the microscopic surface features and the X, Y, and Z measurements are scaled up as desired. The spatial map is converted into a high resolution 3-D scaled-up computer model. The Z measurement in the 3-D scaled up computer model is scaled up 3 to 20 times more than the amount used to scale up the X and Y measurements to increase the depth of the 3-D scaled up computer model. A data set of printing instructions is created from the 3-D scaled-up computer model acceptable for a 3-D printer. A solid scaled-up model of the selected surface in any desired size is printed using the printing instructions in the 3-D printer and using a filament extrusion method or material jetting technology. The surface geometry of the 3-D scaled-up computer model is manipulated to create a base for the solid scaled-up model of the selected surface. The base forms a permanent part of the solid scaled-up model.

The surface of the solid scaled-up model is colored to match the color of the selected surface of the selected article. A color photograph is taken of the selected surface with a digital camera in electronic format. The size of the photograph is scaled to match the size of the surface of the solid scaled-up model. The photograph is then printed directly onto the surface of the solid scaled-up model with a 2-D inkjet printer. Alternately, the color could be printed directly by a color 3-D printer.

An advantage of the present invention is a scaled-up solid model of the microscopic features of a surface.

Another advantage is the use of a profilometer and commercially available software programs to scale up surface features precisely and accurately.

Another advantage is a simple method for accurately producing the scaled-up solid model using a 3-D printer.

Another advantage is a physical hand-held model that can be used to demonstrate accurately the effectiveness of lubrication and anti-friction products both visually and by touch.

BRIEF DESCRIPTION OF THE DRAWINGS

FIG. 1 shows a flow chart diagramming the steps of the present invention for producing a scaled-up 3-D model of microscopic features of a selected surface of a selected article.

DETAILED DESCRIPTION OF THE INVENTION

Figure 2:
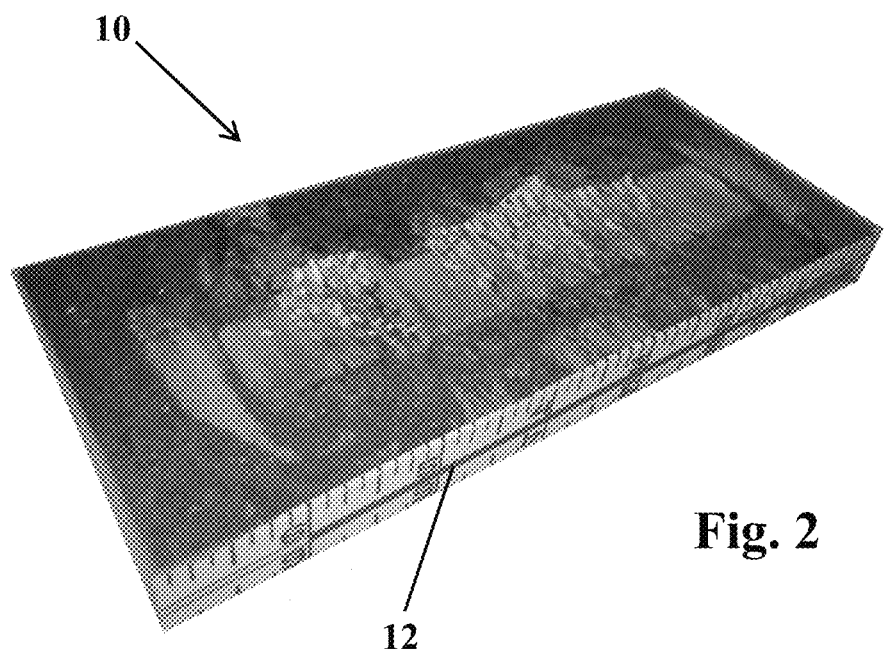
FIG. 2 shows a scaled-up model of a selected surface on a piece of metal exposed to friction, wherein the selected surface was protected with a less effective lubricant.

While the following description details the preferred embodiments of the present invention, it is to be understood that the invention is not limited in its application to the details of the accompanying figures, since the invention is capable of other embodiments and of being practiced in various ways.

Lubricants and anti-friction agents are designed to reduce wear and tear damage on surfaces of metal parts exposed to friction. This damage is often only microscopic but reduces the useful life of the parts. The effects of a lubricant in reducing this damage are not always visible to the naked eye. U.S. Pat. No. 5,166,885 describes a method for non-destructive monitoring of surfaces using 3-D profilometry. A contact profilometer can measure small vertical surface variations as a function of position. A typical profilometer with a diamond stylus can measure small vertical features ranging in height from 10 nanometers to 1 millimeter. The height position of the diamond stylus generates an analog signal which is converted into a digital signal, stored, analyzed, and displayed. The radius of a diamond stylus ranges from 20 nanometers to 50 μm, and the horizontal resolution is controlled by the scan speed and data signal sampling rate. A non-contact profilometer, using technologies such as laser triangulation, confocal microscopy, or interferometry could also be used to acquire the surface spatial map. U.S. Pat. No. 5,166,885 discloses the use of a selective spectral analysis of the 3-D information relating to the 3-D profilometry of the surface. However, this analysis only measures the surface mathematically to obtain average data and does not provide information on the shape of the surface.

The present invention provides a method for measuring the shape of the microscopic features on a selected surface of a selected article using profilometry to create a solid, enlarged surface model for viewing and displaying the microscopic features of the selected surface. FIG. 1 shows the steps of this method. Step 1 includes obtaining profilometry measurements on a selected surface. Any suitable profilometer may be used, for example, a Scantron Proscan 2000™ non-contact profilometer (Scantron Industrial Products ltd, Taunton Somerset England). X, Y, and Z coordinates are scanned on the surface at 0.01 to 5 micron resolution, preferably 0.5 micron resolution. A selected area of about 0.1 to 2 square inches is scanned. The scanning area is limited only by the profilometer instrument. The scanning produces a file containing point data. The file contains X, Y, and Z coordinate data and is in the format of .xyz or .txt.

A spatial map of the surface is created using the profilometry measurements. A 3-D high resolution spatial map of the surface can be created using standard CAD software programs (Step 2). The X, Y, and Z coordinates are scaled up as desired, for example, 10 to 3000 fold, preferably 1,000 fold, 1:1:1. The scale of the coordinates can be varied to enhance the details of the surface as desired.

The spatial map is transposed into a 3-D computer model of the shape of the surface. This is accomplished by taking the point data of the profilometer measurements and fitting them to a surface mesh (Step 3). The point data is imported into Meshlab software and the data is scaled non-uniformly to enhance the surface detail in the Z axis. A surface mesh is produced and exported from Meshlab. The surface mesh, at this point, is not water tight and therefore is not in a format that can be 3D printed. Water tight means that the mesh on all the surfaces is complete, the lines of the mesh create valid elements, and the mesh properly connects to adjacent surfaces around the perimeter so that the volume is fully enclosed. In order to make the mesh water tight, the surface mesh is imported into Rhinoceros software and additional NURBS (non-uniform rational basis spline) objects are added to turn the planar surface mesh, exported from Meshlab, into a 3-dimensional, water tight block. The 3D block is meshed and the water-tight mesh is exported as an STL file that is compatible with 3D printing software. The STL file has no holes, voids, or non-conforming triangles. Since the spatial map of the surface is scaled-up the surface mesh of the surface is also scaled-up. Commercially available Mesh Lab™ (www.meshlab.net) or McNeel and Associates' Rhinoceros' (Novedge, LLC, San Francisco) software can be used to convert the spatial map into a scaled-up meshed surface 3-D computer model (3-D computer model) of the surface of the selected article.

The surface geometry of the 3-D computer model can be manipulated as desired to obtain the desired scaled-up features and to enhance details of the 3-D computer model (Step 4). The point data is scaled non-uniformly to enhance the detail of surface features by scaling up the point coordinate measurements for the Z-coordinate of each point by 3 to 20 times, preferably 10 times, the amount used to scale up the coordinate measurements for X and Y coordinates. Surprisingly, it was discovered that further increasing the scale of the Z coordinate, relative to the X and Y coordinates, remarkably increased the visual detail of the surface model. It is desirable to place the scaled-up surface on a base or block that forms a permanent part of the surface model and to add features to the base, such as letters or notations. The base is, preferably, the same length and width of the surface model. In addition, a cavity can be designed in the base to fit a weight to increase the mass of the surface model. McNeel and Associates' Rhinoceros' software can be used to make these manipulations.

The 3-D computer model is used to create the software for a 3-D printer to print a solid surface model of the microscopic features of the selected surface. The 3-D computer model is converted into printing instructions for a 3-D printer (i.e. put into G-code suitable for a 3-D printer) (Step 5). A slicing program, such as Slic3r™ software (slic3r.org), is suitable for this purpose. Slice3r™ cuts the 3-D digital computer model into horizontal slices (layers), generates toolpaths to fill them, and calculates the amount of material to be extruded from the 3-D printer.

The printing instructions for the 3-D computer model are used with an acceptable three-dimensional printing process (polymer, metal, etc.) to produce a tangible, "hand-held" (or larger) solid scaled-up model of the microscopic features of the surface so that these features can be easily seen and are scaled with dimensional accuracy (Step 6). The length and the width of the model are, preferably, 3 to 10 times the length and width of the selected surface. The depth of the model is, preferably, 9 to 100 times, preferably 50 times the average depth of the abrasions on the selected surface. The printing instructions include a base for the surface which can be of any thickness, preferably 0.25 inches to 1 inch. The preferred 3-D printing method for the surface model is a filament extrusion method wherein a user pours plastic into one end of an extruder which extrudes a filament of desired diameter at an opposite end of the extruder.

The surface of the solid scaled-up model can be colored to match the coloring of the selected surface of the selected article. A preferred method is to use a digital camera to take a color photograph of the selected surface of the selected article in jpeg (electronic) format, scale the size of the photograph to match the size of the surface of the solid scaled-up model, and print the photograph directly onto the surface of the solid scaled-up model with a 2-D ink jet printer, preferably a LogoJET UV2400™ ink jet printer (LogoJET USA, Lafayette, La.) (Step 7). Alternately, the color image can be created directly by special multi-filament 3-D printers such as PartPro350 XBC by XYZ Printing, Taiwan.

EXAMPLE

Two samples of metal plates exposed to friction-induced wear were obtained. In a first sample, the metal surface of the plates was protected with a less effective lubricant. In a second sample, the metal surface was protected with a more effective lubricant. The samples were used to make a solid scaled-up model of a selected surface of each sample. A ½ inch by ¾ inch area of the selected surface of each metal plate was used for analysis and scale-up. Each selected surface was scanned with a Scantron Proscan 2000™ non-contact profilometer having a 0.5 micron resolution. The profilometer measurements were then used to make a 3-D high resolution spatial map of the surface. The X (length), Y (width), and Z (depth) coordinates were scaled-up 1,000-fold. The spatial map was then transposed into a high resolution scaled-up meshed surface. The surface geometry was adjusted from 1:1:1 to 1:1:10 (X, Y, Z) to add depth to the meshed surface. A base was added to the selected surface.

Figure 3:
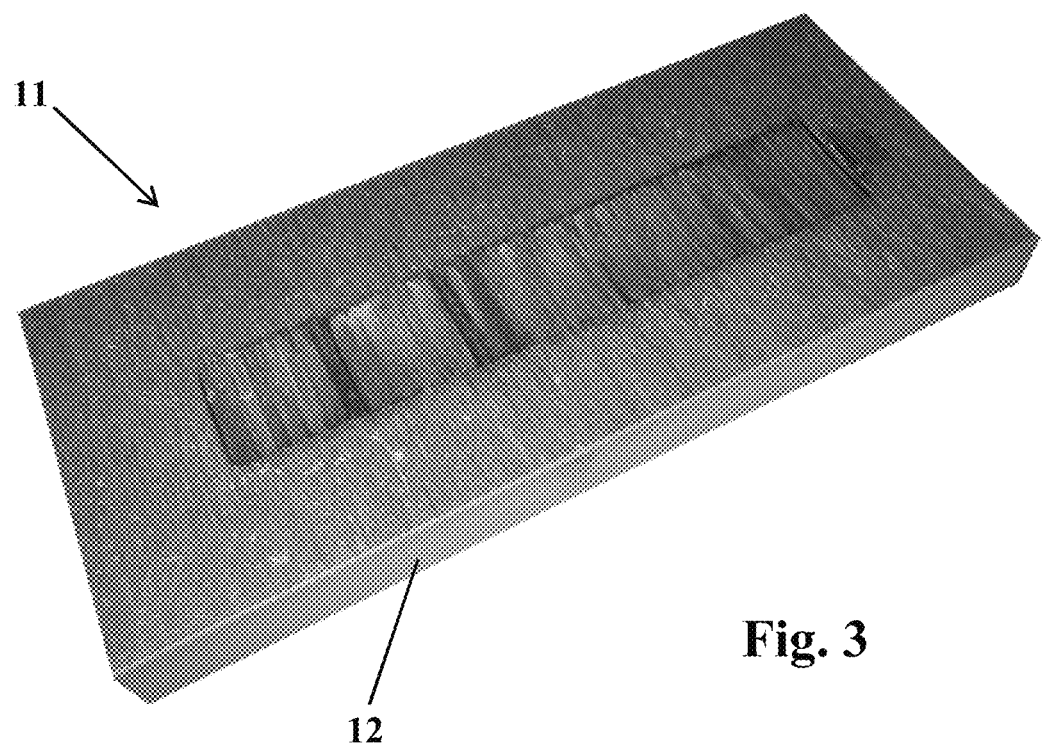
FIG. 3 shows a scaled-up model of a selected surface on a piece of metal exposed to friction, wherein the selected surface was protected with a more effective lubricant.

A data set for 3-D printing was created from the scaled-up meshed surface to provide 3-D printing instructions. A solid scaled-up model 10 of the first selected surface is shown in FIG. 2 and a solid scaled-up model 11 of the second selected surface is shown in FIG. 3. The solid scaled-up models were created with plastic. The length of each model was 7.5 inches and the width was 2.5 inches. The base 12 was 0.75 inches thick. The models provide the microscopic features of the selected surfaces which are easy to see and feel. The model of the second selected surface, with the more effective lubricant, shows clearly less severe abrasion than the model of the first selected surface with the less effective lubricant. These scaled-up models of the selected surfaces are effective in demonstrating the superior properties of one lubricant over another.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the model can have any desired shape in addition to rectangular. The model can be many of any suitable plastic or metal that can be used in a 3-D printer. The method of making the model can be used for any kind of surface that is compatible with profilometry. Other methods of coloring may be used, such as hand painting and hydrographics.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A method for producing a scaled-up solid model of microscopic features of a selected surface of an article, comprising:
    1) scanning said selected surface with a profilometer along X, Y, and Z coordinates to obtain measurements of microscopic surface features;
    2) making a 3-D high resolution spatial map of said microscopic surface features and scaling up the X, Y, and Z measurements as desired;
    3) converting said spatial map into a high resolution 3-D scaled-up computer model, comprising taking point data of the profilometer measurements and fitting them to a surface mesh and adding non-uniform rational basis spline objects to convert a planar surface mesh into a 3-dimensional water tight block, wherein the 3-dimensional water tight block is meshed and exported as an STL file that is compatible with 3D printing software and wherein the STL file has no holes, voids, or non-conforming triangles, thereby providing a scaled-up meshed surface 3-D computer model of the selected surface of the article;
    4) scaling up the Z measurement non-uniformly in the 3-D scaled up computer model 3 to 20 times more than the amount used to scale up the X and Y measurements to increase the depth of the 3-D scaled up computer model, thereby increasing the visual detail of a surface of the scaled-up solid model;
    5) converting the 3-D scaled-up computer model into printing instructions for a 3-D printer using a slicing program; and
    6) printing the solid scaled-up model of the selected surface in any desired size using said printing instructions in the 3-D printer and using a filament extrusion 3-D printing method.

2. The method of claim 1, further comprising manipulating surface geometry of said 3-D scaled-up computer model in addition to depth to further increase the visual detail of the surface of the scaled-up solid model, wherein the scaled-up solid model has no voids, holes, or non-conforming triangles.

3. The method of claim 1, further comprising coloring the surface of the scaled-up solid model by taking a color photograph of the selected surface of the article, with a digital camera, in electronic format, scaling the size of the photograph to match the size of the surface of the scaled-up solid model, and printing the photograph directly onto the surface of the scaled-up solid model with a 2-D inkjet printer.

4. A method for producing a scaled-up solid model of microscopic features of a selected surface, comprising:
    1) scanning said selected surface with a profilometer along X, Y, and Z coordinates to obtain measurements of microscopic surface features;
    2) making a 3-D high resolution spatial map of said microscopic surface features and scaling up the X, Y, and Z measurements as desired;
    3) converting said spatial map into a high resolution 3-D scaled-up computer model, comprising taking point data of the profilometer measurements and fitting them to a surface mesh and adding non-uniform rational basis spline objects to convert a planar surface mesh into a 3-dimensional water tight block, wherein the 3-dimensional water tight block is meshed and exported as an STL file that is compatible with 3D printing software and wherein the STL file has no holes, voids, or non-conforming triangles, thereby providing a scaled-up meshed surface 3-D computer model of the selected surface of the article;
    4) scaling up the Z measurement non-uniformly in the 3-D scaled up computer model 3 to 20 times more than the amount used to scale up the X and Y measurements to increase the depth of the 3-D scaled up computer model, thereby increasing the visual detail of a surface of the scaled-up solid model;
    5) converting the 3-D scaled-up computer model into printing instructions for a 3-D printer using a slicing program;
    6) printing the solid scaled-up model of the selected surface in any desired size using said printing instructions in the 3-D printer and using a filament extrusion 3-D printing method; and
    7) manipulating surface geometry of said 3-D scaled-up computer model in addition to depth to further increase the visual detail of the surface of the scaled-up solid model wherein the scaled-up solid model has no voids, holes, or non-conforming triangles.

5. The method of claim 4, further comprising coloring the surface of the scaled-up solid model by taking a color photograph of the selected surface of the article, with a digital camera, in electronic format, scaling the size of the photograph to match the size of the surface of the scaled-up solid model, and printing the photograph directly onto the surface of the scaled-up solid model with a 2-D inkjet printer.

6. A scaled-up solid model of microscopic features of a selected surface of an article, produced by a method comprising:
    1) scanning said selected surface with a profilometer along X, Y, and Z coordinates to obtain measurements of microscopic surface features;
    2) making a 3-D high resolution spatial map of said microscopic surface features and scaling up the X, Y, and Z measurements as desired;

3) converting said spatial map into a high resolution 3-D scaled-up computer model, comprising taking point data of the profilometer measurements and fitting them to a surface mesh and adding non-uniform rational basis spline objects to convert a planar surface mesh into a 3-dimensional water tight block, wherein the 3-dimensional water tight block is meshed and exported as an STL file that is compatible with 3D printing software and wherein the STL file has no holes, voids, or non-conforming triangles, thereby providing a scaled-up meshed surface 3-D computer model of the selected surface of the article;

4) scaling up the Z measurement non-uniformly in the 3-D scaled up computer model 3 to 20 times more than the amount used to scale up the X and Y measurements to increase the depth of the 3-D scaled up computer model, thereby increasing the visual detail of a surface of the scaled-up solid model;

5) converting the 3-D scaled-up computer model into printing instructions for a 3-D printer using a slicing program; and 6) printing a solid scaled-up model of the selected surface in any desired size using said printing instructions in the 3-D printer and using a filament extrusion 3-D printing method.

7. The scaled up solid model of claim 6, further comprising manipulating surface geometry of said 3-D scaled-up computer model in addition to depth to further increase the visual detail of the surface of the scaled-up solid model, wherein the scaled-up solid model has no voids, holes, or non-conforming triangles.

8. The scaled up solid model of claim 6, further comprising coloring the scaled-up solid model by taking a color photograph of the selected surface of the article, with a digital camera, in electronic format, scaling the size of the photograph to match the size of the surface of the scaled-up solid model, and printing the photograph directly onto the surface of the scaled-up solid model with a 2-D inkjet printer.

9. A scaled-up solid model of microscopic features of a selected surface of an article, produced by a method comprising:

1) scanning said selected surface with a profilometer along X, Y, and Z coordinates to obtain measurements of microscopic surface features;

2) making a 3-D high resolution spatial map of said microscopic surface features and scaling up the X, Y, and Z measurements as desired;

3) converting said spatial map into a high resolution 3-D scaled-up computer model, comprising taking point data of the profilometer measurements and fitting them to a surface mesh and adding non-uniform rational basis spline objects to convert a planar surface mesh into a 3-dimensional water tight block, wherein the 3-dimensional water tight block is meshed and exported as an STL file that is compatible with 3D printing software and wherein the STL file has no holes, voids, or non-conforming triangles, thereby providing a scaled-up meshed surface 3-D computer model of the selected surface of the article;

4) scaling up the Z measurement non-uniformly in the 3-D scaled up computer model 3 to 20 times more than the amount used to scale up the X and Y measurements to increase the depth of the 3-D scaled up computer model, thereby increasing the visual detail of a surface of the scaled-up solid model;

5) converting the 3-D scaled-up computer model into printing instructions for a 3-D printer using a slicing program;

6) printing a solid scaled-up model of the selected surface in any desired size using said printing instructions in the 3-D printer and using a filament extrusion 3-D printing method; and 7) manipulating surface geometry of said 3-D scaled-up computer model in addition to depth to further increase the visual detail of the surface of the scaled-up solid model, wherein the scaled-up solid model has no voids, holes, or non-conforming triangles.

10. The scaled-up solid model of claim 9, further comprising coloring the scaled-up solid model by taking a color photograph of the selected surface of the article, with a digital camera, in electronic format, scaling the size of the photograph to match the size of the surface of the solid scaled-up solid, and printing the photograph directly onto the surface of the scaled-up solid model with a 2-D inkjet printer.

* * * * *